US012509620B1

(12) United States Patent
Li et al.

(10) Patent No.: US 12,509,620 B1
(45) Date of Patent: Dec. 30, 2025

(54) POLYCARBOXYLATE THINNER FOR CARBONATE/BICARBONATE CONTAMINATION RESISTANT WATER-BASED DRILLING FLUID AND PREPARATION METHOD AND APPLICATION THEREOF

(71) Applicant: CHINA UNIVERSITY OF PETROLEUM (EAST CHINA), Qingdao (CN)

(72) Inventors: Jian Li, Qingdao (CN); Jinsheng Sun, Qingdao (CN); Kaihe Lv, Qingdao (CN); Yingrui Bai, Qingdao (CN); Jingping Liu, Qingdao (CN); Xianbin Huang, Qingdao (CN); Jintang Wang, Qingdao (CN); Jiafeng Jin, Qingdao (CN); Meichun Li, Qingdao (CN); Bo Liao, Qingdao (CN); Junjie Zheng, Qingdao (CN)

(73) Assignee: CHINA UNIVESITY OF PETROLEUM (EAST CHINA), Qingdao (CN)

( * ) Notice: Subject to any disclaimer, the term of this patent is extended or adjusted under 35 U.S.C. 154(b) by 0 days.

(21) Appl. No.: 19/250,126

(22) Filed: Jun. 26, 2025

(30) Foreign Application Priority Data

Aug. 9, 2024 (CN) .......................... 202411088087.2

(51) Int. Cl.
*C09K 8/24* (2006.01)
*C08F 290/06* (2006.01)

(52) U.S. Cl.
CPC ............ *C09K 8/24* (2013.01); *C08F 290/062* (2013.01)

(58) Field of Classification Search
CPC .............................. C09K 8/24; C08F 290/062
See application file for complete search history.

(56) References Cited

FOREIGN PATENT DOCUMENTS

| CN | 101397491 A |   | 4/2009 |            |
|----|-------------|---|--------|------------|
| CN | 101397491 B | * | 2/2011 |            |
| CN | 101967369 A |   | 2/2011 |            |
| CN | 103289658 A |   | 11/2013|            |
| CN | 106866895 A | * | 6/2017 | C04B 24/2694 |
| CN | 113563539 A |   | 10/2021|            |
| CN | 2023206900 A1 |  | 11/2023|            |
| CN | 117756995 A |   | 3/2024 |            |
| JP | 2004300269 A | * | 10/2004|            |

OTHER PUBLICATIONS

Chen Xiaofei, Preparation and Performance of PAMAP Filter Loss Reducer with High Temperature and Salt Resistant Fine Petrochemicals, vol. 37, issue 2:36-40 Publication date: Mar. 31, 2020.

* cited by examiner

*Primary Examiner* — Kumar R Bhushan
(74) *Attorney, Agent, or Firm* — CBM PATENT CONSULTING, LLC

(57) ABSTRACT

A polycarboxylate thinner for a carbonate/bicarbonate contamination resistant water-based drilling fluid is prepared from the following raw materials in part by mass: 5 to 10 parts of acrylic acid, 1 to 5 parts of N-vinylpyrrolidone, 5 to 10 parts of sodium methallyl sulfonate, 40 to 50 parts of isopentenyl polyethylene glycol ether, 0.02 to 0.6 part of oxidizing agent, 45 to 55 parts of reducing agent, and 40 to 60 parts of water. The thinner can solve problems caused by $HCO_3^-$ and $CO_3^{2-}$ contamination in a drilling fluid, such as fluid thickening, increased viscosity and shear force, and elevated fluid loss. When applied to the drilling fluid contaminated with $HCO_3^-$ and $CO_3^{2-}$, the thinner can effectively reduce viscosity, shear force, and fluid loss of the drilling fluid.

8 Claims, No Drawings

ND METHOD AND APPLICATION THEREOF

POLYCARBOXYLATE THINNER FOR CARBONATE/BICARBONATE CONTAMINATION RESISTANT WATER-BASED DRILLING FLUID AND PREPARATION METHOD AND APPLICATION THEREOF

CROSS-REFERENCE TO RELATED APPLICATIONS

This application claims priority to Chinese Patent Application Ser. No. CN202411088087.2 filed on 9 Aug. 2024.

FIELD OF THE INVENTION

The present disclosure relates to the technical field of drilling fluid additives, and particularly, to a polycarboxylate thinner for a carbonate/bicarbonate contamination resistant water-based drilling fluid and a preparation method and application thereof.

BACKGROUND OF THE INVENTION

Drilling is an essential process for establishing a connection between underground oil and gas reservoirs and surface engineering. Drilling fluid, often referred to as the "blood" of drilling operations, plays a critical role in ensuring drilling success by stabilizing wellbore walls, suspending cuttings, cooling the drill bit, and enhancing the rate of penetration. Based on composition, drilling fluid is mainly categorized into oil-based drilling fluid, synthetic-based drilling fluid, and water-based drilling fluid. The oil-based drilling fluid exhibits outstanding high-temperature resistance, salt and calcium tolerance, and contamination resistance. However, its relatively high cost and significant environmental contamination limit its large-scale application. In contrast, the water-based drilling fluid composed of water, bentonite, chemical additives, and other components represents the mainstream direction in the current drilling fluid industry.

As oil and gas exploration and development progressively extend into unconventional and deep reservoirs, geological conditions become increasingly complex. During drilling operations, various contaminants (such as salt ions and acidic gases) in formations are frequently encountered, posing significant challenges to the performance of the drilling fluid. Specifically, $CO_2$ contamination from formations is one of the most common issues in the drilling process. In the drilling process, the intrusion of $CO_2$ causes the drilling fluid to thicken, significantly increasing viscosity and shear force, which can easily lead to excessive pump pressure and severely hinder safe and efficient drilling. Additionally, $CO_2$ contamination adversely affects filter cake quality, resulting in the formation of thick and loose filter cakes on wellbore walls. This increases fluid loss of the drilling fluid and ultimately leads to wellbore instability and fracture leakage. Typically, after $CO_2$ enters the drilling fluid, it reacts with water to form $H_2CO_3$. However, $H_2CO_3$ is unstable and readily hydrolyzed into $HCO_3^-$ and $CO_3^{2-}$ ions. Therefore, there is an urgent need to develop drilling fluid thinners that are effective under $HCO_3^-$ and $CO_3^{2-}$ contamination, to reduce viscosity, shear force, and fluid loss of the drilling fluid in the drilling process.

SUMMARY OF THE INVENTION

To overcome shortcomings of the prior art, the present disclosure provides a polycarboxylate thinner for a carbonate/bicarbonate contamination resistant water-based drilling fluid and a preparation method and application thereof. The thinner of the present disclosure can solve problems caused by $HCO_3^-$ and $CO_3^{2-}$ contamination in a drilling fluid, such as fluid thickening, increased viscosity and shear force, and elevated fluid loss. When applied to the drilling fluid contaminated with $HCO_3^-$ and $CO_3^{2-}$, the thinner can effectively reduce viscosity, shear force, and fluid loss of the drilling fluid.

To achieve the above objective, the present disclosure adopts the following technical solution.

A polycarboxylate thinner for a carbonate/bicarbonate contamination resistant water-based drilling fluid is prepared from the following raw materials in part by mass: 5 to 10 parts of acrylic acid, 1 to 5 parts of N-vinylpyrrolidone, 5 to 10 parts of sodium methallyl sulfonate, 40 to 50 parts of isopentenyl polyethylene glycol ether, 0.02 to 0.6 part of oxidizing agent, 45 to 55 parts of reducing agent, and 40 to 60 parts of water.

According to the present disclosure, preferably, the polycarboxylate thinner for a carbonate/bicarbonate contamination resistant water-based drilling fluid is prepared from the following raw materials in part by mass: 7 to 8 parts of acrylic acid, 2.5 to 3.5 parts of N-vinylpyrrolidone, 6.3 to 8.3 parts of sodium methallyl sulfonate, 45 to 50 parts of isopentenyl polyethylene glycol ether, 0.048 to 0.168 part of oxidizing agent, 50 to 51 parts of reducing agent, and 45 to 50 parts of water.

Preferably, the polycarboxylate thinner for a carbonate/bicarbonate contamination resistant water-based drilling fluid is prepared from the following raw materials in part by mass: 7.2 parts of acrylic acid, 3.5 parts of N-vinylpyrrolidone, 6.3 parts of sodium methallyl sulfonate, 48 parts of isopentenyl polyethylene glycol ether, 0.168 part of oxidizing agent, 50.048 parts of reducing agent, and 50 parts of water.

According to the present disclosure, preferably, the isopentenyl polyethylene glycol ether is TPEG-2400 or TPEG-3000.

According to the present disclosure, preferably, the oxidizing agent is hydrogen peroxide at a mass concentration of 3%.

According to the present disclosure, preferably, the reducing agent is ascorbic acid ($V_C$).

A preparation method of the polycarboxylate thinner for a carbonate/bicarbonate contamination resistant water-based drilling fluid includes the following steps:

fully dispersing isopentenyl polyethylene glycol ether and an oxidizing agent in water, and performing reaction to obtain a mixture; and dropwise adding a mixture of acrylic acid (AA), N-vinylpyrrolidone (NVP), and sodium methallyl sulfonate (SMAS), then dropwise adding a reducing agent aqueous solution, performing reaction, and adjusting a pH value, to obtain the polycarboxylate thinner for the carbonate/bicarbonate contamination resistant water-based drilling fluid.

According to the present disclosure, preferably, after full dispersion of the isopentenyl polyethylene glycol ether and the oxidizing agent in the water, a reaction temperature is room temperature, a reaction duration is 3-5 h, and the reaction is performed under protection of a protective gas with continuous stirring. Preferably, the protective gas is nitrogen or argon.

According to the present disclosure, preferably, a dropwise addition rate of the mixture of the acrylic acid (AA), the N-vinylpyrrolidone (NVP), and the sodium methallyl sulfonate (SMAS) is 5-10 g/h; and dropwise addition is performed at room temperature and under protection of a protective gas with continuous stirring. Preferably, the protective gas is nitrogen or argon.

According to the present disclosure, preferably, a mass concentration of the reducing agent aqueous solution is 0.05% to 0.1%; a dropwise addition rate of the reducing agent aqueous solution is 10-30 g/h; and the reducing agent aqueous solution is dropwise added at room temperature and under protection of a protective gas with continuous stirring. Preferably, the protective gas is nitrogen or argon.

According to the present disclosure, preferably, after dropwise addition of the reducing agent aqueous solution, a reaction temperature is room temperature, a reaction duration is 2-6 h, and the reaction is performed under protection of a protective gas with continuous stirring. Preferably, the protective gas is nitrogen or argon.

According to the present disclosure, preferably, the pH value is adjusted to 7-11, preferably 7-8 by using a sodium hydroxide aqueous solution at a mass concentration of 10%-30%.

Application of the polycarboxylate thinner for a carbonate/bicarbonate contamination resistant water-based drilling fluid is to apply the thinner to the carbonate/bicarbonate contaminated water-based drilling fluid to reduce viscosity, shear force, and fluid loss.

The present disclosure has the following technical features and beneficial effects.
1. A preparation process is simple, synthesized monomers are common, cheap, and readily available, a synthesizing temperature and duration are easily controlled, and the obtained thinner is safe, environment-friendly, free of irritating odor, and low in cost.
2. The thinner for the drilling fluid has excellent thinning and viscosity-reducing capabilities in the drilling fluid, has an outstanding characteristic of high resistance to carbonate/bicarbonate contamination, can reduce apparent viscosity, plastic viscosity, shear force, and fluid loss of a drilling fluid system, and greatly improves drilling efficiency.
3. The ascorbic acid added in the present disclosure, serving as the reducing agent, can form a redox system with the hydrogen peroxide, and can promote decomposition of the hydrogen peroxide to generate free radicals and further initiate polymerization reaction of monomers. The hydrogen peroxide added in the present disclosure, serving as the oxidizing agent, provides an oxidizing capacity, promotes polymerization of monomer molecules, enables a reaction to proceed smoothly, and improves a reaction rate and efficiency. Additionally, a progress of the reaction also can be adjusted by controlling a dosage and dropwise addition rate of the hydrogen peroxide. Compared with other redox systems, the redox system used in the present disclosure enables faster polymerization and is favorable for obtaining a high-performance thinner.
4. The sodium methallyl sulfonate added in the present disclosure can provide sulfonic acid groups and improve temperature and salt resistance of the thinner; the N-vinylpyrrolidone added has effects in increasing a stability of the drilling fluid and inhibiting shale hydration and dispersion; and the isopentenyl polyethylene glycol ether selected can improve a hydration and dispersion effect of clay and has good rheological modifiability and fluid-loss control performance.
5. The thinner for the drilling fluid obtained in the present disclosure contains functional groups such as —$SO_3^-$ and —OH, which can be adsorbed onto a surface of clay through electrostatic interactions, to form a thick hydration film. This promotes mutual repulsion between clay particles, and prevents the clay particles from aggregating/flocculating and forming a network structure, thereby stabilizing the drilling fluid system; and pyrrolidone rings and sulfonic groups in a molecular chain provide a high thermal stability, maintaining a superior flow stability even under high-temperature conditions. Meanwhile, the presence of the sulfonic groups also can improve electrolyte contamination resistance of the drilling fluid.
6. The thinner for the drilling fluid obtained in the present disclosure contains strong adsorption groups capable of competitively adsorbing $HCO_3^-$ and $CO_3^{2-}$ ions, which allows for more adsorption sites on the surface of the clay, to enhance a stability of the system and achieve an effect in reducing the viscosity of the drilling fluid.
7. The thinner for the drilling fluid obtained in the present disclosure disrupts a pre-existing network structure in a thickened drilling fluid and inhibits formation of a new framework structure. Meanwhile, the adsorption groups can form coordinate bonds with the clay particles, whereby a repulsive force of a diffuse double layer at particle edges is enhanced, a thickness of the hydration shell is increased, and ultimately objectives of preventing the drilling fluid from thickening and improving a rheological property of the drilling fluid are achieved. Raw material composition and the preparation method, serving as a whole, synergistically contribute to achieving superior performance of the present disclosure; and any unsuitable replacement of raw material, proportioning, and preparation conditions can reduce the performance of the thinner.

DETAILED DESCRIPTION OF THE EMBODIMENTS

The present disclosure will be further described below with reference to specific embodiments, but not limited to this.

Unless otherwise specified, experimental methods in the embodiments are all conventional methods; and unless otherwise specified, reagents and materials used are commercially available.

Example 1

A preparation method of a polycarboxylate thinner for a carbonate/bicarbonate contamination resistant water-based drilling fluid included the following steps:
1) 48 g of isopentenyl polyethylene glycol ether (TPEG-2400), 48 mg of hydrogen peroxide (3%), and 50 g of deionized water were respectively added into a triangular-bottomed open-mouthed flask, and stirred, to obtain a mixture;
2) the mixture in the triangular-bottomed open-mouthed flask was reacted for 4 h at room temperature and under protection of nitrogen with continuous stirring;
3) 6.3 g of sodium methallyl sulfonate was dissolved in 7.2 g of acrylic acid and 3.5 g of N-vinylpyrrolidone, the mixture was dropwise added from one side of the triangular-bottomed open-mouthed flask by using a constant-pressure separating funnel at room temperature and under protection of nitrogen with continuous stirring, and dropwise addition was finished within 2 h;
4) 48 mg of ascorbic acid and 50 g of deionized water were mixed, the mixture was dropwise added from the other side of the triangular-bottomed open-mouthed flask by using the constant-pressure separating funnel at room temperature and under protection of nitrogen with continuous stirring, and dropwise addition was finished within 2 h;
5) a reaction was performed for 4 h at room temperature and under protection of nitrogen with continuous stirring; and
6) after the reaction, a pH value was adjusted to 7 by using a sodium hydroxide aqueous solution at a mass concentration of 20%, and the obtained product was the polycarboxylate thinner for a carbonate/bicarbonate contamination resistant water-based drilling fluid.

Example 2

A preparation method of a polycarboxylate thinner for a carbonate/bicarbonate contamination resistant water-based drilling fluid was the same as that in Example 1, and a difference lay in that a dosage of hydrogen peroxide was 96 mg, and other steps and conditions were the same as those in Example 1.

Example 3

A preparation method of a polycarboxylate thinner for a carbonate/bicarbonate contamination resistant water-based drilling fluid was the same as that in Example 1, and a difference lay in that a dosage of hydrogen peroxide was 168 mg, and other steps and conditions were the same as those in Example 1.

Example 4

A preparation method of a polycarboxylate thinner for a carbonate/bicarbonate contamination resistant water-based drilling fluid was the same as that in Example 3, and a difference lay in that a dosage of N-vinylpyrrolidone was 2.5 g, and other steps and conditions were the same as those in Example 3.

Example 5

A preparation method of a polycarboxylate thinner for a carbonate/bicarbonate contamination resistant water-based drilling fluid was the same as that in Example 3, and a difference lay in that a dosage of sodium methallyl sulfonate was 8.3 g, and other steps and conditions were the same as those in Example 3.

Example 6

A preparation method of a polycarboxylate thinner for a carbonate/bicarbonate contamination resistant water-based drilling fluid was the same as that in Example 3, and a difference lay in that a pH value was adjusted to 10 by using a sodium hydroxide aqueous solution at a mass concentration of 20%, and other steps and conditions were the same as those in Example 3.

Example 7

A preparation method of a polycarboxylate thinner for a carbonate/bicarbonate contamination resistant water-based drilling fluid was the same as that in Example 3, and a difference lay in that a reaction duration after addition of a reducing agent was 2 h, and other steps and conditions were the same as those in Example 3.

Example 8

A preparation method of a polycarboxylate thinner for a carbonate/bicarbonate contamination resistant water-based drilling fluid was the same as that in Example 3, and a difference lay in that a dropwise addition duration of a mixture of acrylic acid (AA), N-vinylpyrrolidone (NVP), and sodium methallyl sulfonate (SMAS) was 3 h, and other steps and conditions were the same as those in Example 3.

Example 9

A preparation method of a polycarboxylate thinner for a carbonate/bicarbonate contamination resistant water-based drilling fluid was the same as that in Example 3, and a difference lay in that a dropwise addition duration of a reducing agent aqueous solution was 3 h, and other steps and conditions were the same as those in Example 3.

Example 10

A preparation method of a polycarboxylate thinner for a carbonate/bicarbonate contamination resistant water-based drilling fluid was the same as that in Example 3, and a difference lay in that isopentenyl polyethylene glycol ether was isopentenyl polyethylene glycol ether (TPEG-3000), and other steps and conditions were the same as those in Example 3.

Comparative Example 1

A preparation method of a thinner included the following steps:
1) 48 g of isopentenyl polyethylene glycol ether (TPEG-2400) and 50 g of deionized water were respectively added into a triangular-bottomed open-mouthed flask, and stirred, to obtain a mixture;
2) the mixture in the triangular-bottomed open-mouthed flask was reacted for 4 h at room temperature and under protection of nitrogen with continuous stirring;
3) 6.3 g of sodium methallyl sulfonate was dissolved in 7.2 g of acrylic acid and 3.5 g of N-vinylpyrrolidone, the mixture was dropwise added from one side of the triangular-bottomed open-mouthed flask by using a constant-pressure separating funnel at room temperature and under protection of nitrogen with continuous stirring, and dropwise addition was finished within 2 h;
4) 65 mg of 2,2'-azobis(2-methylpropionamidine) dihydrochloride and 50 g of deionized water were mixed, the mixture was dropwise added from the other side of the triangular-bottomed open-mouthed flask by using the constant-pressure separating funnel at room temperature and under protection of nitrogen with continuous stirring, and dropwise addition was finished within 2 h;
5) a reaction was performed for 4 h at room temperature and under protection of nitrogen with continuous stirring; and
6) after the reaction, a pH value was adjusted to 7 by using a sodium hydroxide aqueous solution at a mass concentration of 20%, and the obtained product was the thinner.

Comparative Example 2

A preparation method of a thinner was the same as that in Comparative Example 1, and a difference lay in that 2,2'- azobis(2-methylpropionamidine) dihydrochloride was replaced by 65 mg of peroxosulfuric acid and 21 mg of sodium sulfite, and other steps and conditions were the same as those in Comparative Example 1.

Comparative Example 3

A preparation method of a thinner was the same as that in Example 3, and a difference lay in that sodium methallyl sulfonate was replaced by sodium allysulfonate, and other steps and conditions were the same as those in Example 3.

Comparative Example 4

A preparation method of a thinner was the same as that in Example 3, and a difference lay in that sodium methallyl sulfonate was replaced by sodium p-styrenesulfonate, and other steps and conditions were the same as those in Example 3.

Comparative Example 5

A preparation method of a thinner was the same as that in Example 3, and a difference lay in that acrylic acid was replaced by acrylamide, and other steps and conditions were the same as those in Example 3.

Comparative Example 6

A preparation method of a thinner was the same as that in Example 3, and a difference lay in that isopentenyl polyethylene glycol ether was not added, and other steps and conditions were the same as those in Example 3.

The preparation method specifically included the following steps:
1) 48 mg of hydrogen peroxide (3%) and 50 g of deionized water were respectively added into a triangular-bottomed open-mouthed flask, and stirred, to obtain a mixture;
2) the mixture in the triangular-bottomed open-mouthed flask was reacted for 4 h at room temperature and under protection of nitrogen with continuous stirring;
3) 6.3 g of sodium methallyl sulfonate was dissolved in 7.2 g of acrylic acid and 3.5 g of N-vinylpyrrolidone, the mixture was dropwise added from one side of the triangular-bottomed open-mouthed flask by using a constant-pressure separating funnel at room temperature and under protection of nitrogen with continuous stirring, and dropwise addition was finished within 2 h;
4) 48 mg of ascorbic acid and 50 g of deionized water were mixed, the mixture was dropwise added from the other side of the triangular-bottomed open-mouthed flask by using the constant-pressure separating funnel at room temperature and under protection of nitrogen with continuous stirring, and dropwise addition was finished within 2 h;
5) a reaction was performed for 4 h at room temperature and under protection of nitrogen with continuous stirring; and
6) after the reaction, a pH value was adjusted to 7 by using a sodium hydroxide aqueous solution at a mass concentration of 20%, and the obtained product was the thinner.

Comparative Example 7

A preparation method of a thinner was the same as that in Example 3, and a difference lay in that N-vinylpyrrolidone was not added, and other steps and conditions were the same as those in Example 3.

Comparative Example 8

A preparation method of a thinner was the same as that in Example 3, and a difference lay in that sodium methallyl sulfonate was not added, and other steps and conditions were the same as those in Example 3.

Comparative Example 9

A preparation method of a thinner was the same as that in Example 3, and a difference lay in that isopentenyl polyethylene glycol ether was replaced by allyl polyethylene glycol ether, and other steps and conditions were the same as those in Example 3.

Experimental Example 1

Thinners prepared in the examples and comparative examples were subjected to a rheology test.

(1) Sample Preparation

A drilling fluid was prepared by the following steps: 400 mL of 4% drilling fluid base (520 g of bentonite and 18.2 g of sodium carbonate were added into 1,300 mL of water) was taken, and 0.6 g of sodium carboxymethyl cellulose salt, 0.6 g of cationic polyacrylate cellulose, 20 g of sulfonated phenolic resin, 20 g of lignite resin, 580 g of barite (to adjust a density of the drilling fluid to 1.8 kg/m$^3$), 16 g of sodium carbonate, 16 g of sodium bicarbonate, and 8 g of thinner in any of examples or comparative examples were respectively added into the drilling fluid base and fully stirred for 30 min through a high-speed stirrer, to obtain a sample. The sample was aged at 180° C. for 16 h and cooled, and then a rheological property and fluid-loss control performance of the sample before and after aging were tested at room temperature. A drilling fluid without any thinner was taken as a control sample.

(2) Test Method

A certain amount of prepared sample was poured into a test slurry cup, and readings of $\theta_{600}$, $\theta_{300}$, $\theta_{200}$, $\theta_{100}$, $\theta_6$, $\theta_3$, $G_1$, and $G_2$ (initial shear and final shear) were recorded by using an electronic six-speed viscometer.

An American Petroleum Institute (API) fluid loss of the sample was determined by using a medium-pressure filter press (ZNSJ-5A, Qingdao Tongchun Petroleum Instrument Co., Ltd., China) at 100 MPa, a filtrate volume was recorded after 7.5 minutes, and the API fluid loss was calculated as twice this volume.

For the rheological property, test results are shown in Tables 1 and 2.

TABLE 1

Performance test of the thinner for the drilling fluid before aging

| Sample | $\theta_{600}$ (mPa·s) | $\theta_6$ (mPa·s) | $\theta_3$ (mPa·s) | YP/PV (Pa/mPa·s) | $G_1$ (Pa) | $G_2$ (Pa) | $FL_{API}$ (mL) |
|---|---|---|---|---|---|---|---|
| Control | 98 | 23 | 20 | 0.37 | 25 | 26 | 53 |
| Example 1 | 73 | 12 | 10 | 0.85 | 12 | 15 | 25 |
| Example 2 | 80 | 15 | 13 | 0.76 | 13 | 16 | 32 |
| Example 3 | 73 | 11 | 11 | 0.86 | 10 | 11 | 18 |
| Example 4 | 76 | 15 | 12 | 0.84 | 14 | 17 | 28 |
| Example 5 | 88 | 18 | 16 | 0.91 | 16 | 19 | 39 |
| Example 6 | 73 | 12 | 11 | 0.6 | 10 | 14 | 27 |
| Example 7 | 80 | 15 | 12 | 0.42 | 13 | 13 | 35 |
| Example 8 | 68 | 14 | 13 | 0.5 | 13 | 14 | 20 |
| Example 9 | 86 | 17 | 16 | 0.81 | 15 | 17 | 41 |
| Example 10 | 79 | 16 | 13 | 0.2 | 12 | 14 | 32 |
| Comparative Example 1 | 79 | 16 | 15 | 0.54 | 16 | 19 | 31 |
| Comparative Example 2 | 95 | 12 | 12 | 1 | 11 | 11 | 39 |
| Comparative Example 3 | 72 | 20 | 18 | 0.4 | 17 | 17 | 35 |
| Comparative Example 4 | 76 | 15 | 14 | 0.5 | 12 | 14 | 34 |
| Comparative Example 5 | 81 | 20 | 18 | 0.3 | 16 | 18 | 37 |
| Comparative Example 6 | 92 | 21 | 20 | 0.17 | 20 | 21 | 42 |
| Comparative Example 7 | 90 | 22 | 19 | 0.2 | 18 | 20 | 41 |
| Comparative Example 8 | 97 | 25 | 21 | 0.42 | 21 | 21 | 49 |
| Comparative Example 9 | 85 | 19 | 17 | 0.43 | 15 | 15 | 36 |

TABLE 2

Performance test of the thinner for the drilling fluid after aging at 180° C.

| Sample | $\theta_{600}$ (mPa·s) | $\theta_6$ (mPa·s) | $\theta_3$ (mPa·s) | YP/PV (Pa/mPa·s) | $G_1$ (Pa) | $G_2$ (Pa) | $FL_{API}$ (mL) |
|---|---|---|---|---|---|---|---|
| Control | 104 | 51 | 42 | 0.34 | 29 | 34 | 63 |
| Example 1 | 77 | 44 | 35 | 0.75 | 29 | 33 | 29 |
| Example 2 | 83 | 45 | 30 | 0.6 | 30 | 34 | 37 |
| Example 3 | 68 | 20 | 20 | 1 | 12 | 19 | 25 |
| Example 4 | 72 | 41 | 36 | 0.87 | 29 | 30 | 28 |
| Example 5 | 81 | 43 | 40 | 0.5 | 30 | 31 | 31 |
| Example 6 | 78 | 32 | 32 | 1.2 | 33 | 40 | 30 |
| Example 7 | 76 | 27 | 27 | 0.95 | 28 | 38 | 31 |
| Example 8 | 71 | 26 | 26 | 0.4 | 29 | 38 | 29 |
| Example 9 | 88 | 25 | 37 | 0.5 | 24 | 31 | 35 |
| Example 10 | 86 | 31 | 30 | 0.63 | 26 | 28 | 34 |
| Comparative Example 1 | 79 | 45 | 34 | 0.7 | 29 | 30 | 30 |
| Comparative Example 2 | 80 | 48 | 31 | 0.2 | 27 | 32 | 32 |
| Comparative Example 3 | 71 | 39 | 34 | 0.35 | 27 | 30 | 35 |
| Comparative Example 4 | 81 | 45 | 39 | 0.4 | 29 | 32 | 31 |
| Comparative Example 5 | 79 | 30 | 27 | 0.58 | 32 | 35 | 30 |
| Comparative Example 6 | 95 | 51 | 32 | 1.5 | 35 | 39 | 50 |
| Comparative Example 7 | 89 | 49 | 30 | 0.85 | 34 | 36 | 45 |
| Comparative Example 8 | 98 | 50 | 35 | 0.6 | 31 | 35 | 58 |
| Comparative Example 9 | 90 | 48 | 38 | 0.7 | 30 | 37 | 47 |

From data in Tables 1 and 2, it may be seen that the thinner for the drilling fluid prepared in the present disclosure exhibits good viscosity-reducing performance at room temperature and after aging at 180° C., and demonstrates a significant viscosity-reducing effect. It also maintains a large ratio of yield point to plastic viscosity (YP/PV), indicating good shear thinning behavior of the drilling fluid. Moreover, the fluid loss is relatively low.

In summary, the polycarboxylate thinner for a carbonate/bicarbonate contamination resistant water-based drilling fluid may meet a requirement of the drilling fluid for resisting carbonate/bicarbonate contamination.

The above detailed description illustrates preferred implementations of the present disclosure. However, the present disclosure is not limited to specific details in the above implementations, various simple variations may be made to the technical solutions of the present disclosure within the technical concept scope, and these simple variations shall fall within the protection scope of the present disclosure.

In addition, it should be noted that all described specific technical features in the above specific implementations may be combined by any proper method in case of no conflict. In order to avoid unnecessary repetition, the present disclosure will not describe various possible combination methods separately.

Moreover, various implementations of the present disclosure may also be combined freely, and the combinations shall be equally regarded as contents disclosed by the present disclosure, provided that they do not depart from the concept of the present disclosure.

What is claimed is:

1. A polycarboxylate thinner for a carbonate/bicarbonate contamination resistant water-based drilling fluid, being prepared from the following raw materials in part by mass: 5 to 10 parts of an acrylic acid, 1 to 5 parts of a N-vinylpyrrolidone, 5 to 10 parts of a sodium methallyl sulfonate, 40 to 50 parts of an isopentenyl polyethylene glycol ether, 0.02 to 0.6 part of an oxidizing agent, 45 to 55 parts of a reducing agent, and 40 to 60 parts of water, wherein
    the oxidizing agent is hydrogen peroxide at a mass concentration of 3%; and the reducing agent is ascorbic acid.

2. The polycarboxylate thinner for the carbonate/bicarbonate contamination resistant water-based drilling fluid according to claim 1, being prepared from the following raw materials in part by mass: 7 to 8 parts of the acrylic acid, 2.5 to 3.5 parts of the N-vinylpyrrolidone, 6.3 to 8.3 parts of the sodium methallyl sulfonate, 45 to 50 parts of the isopentenyl polyethylene glycol ether, 0.048 to 0.168 part of the oxidizing agent, 50 to 51 parts of the reducing agent, and 45 to 50 parts of the water.

3. The polycarboxylate thinner for the carbonate/bicarbonate contamination resistant water-based drilling fluid according to claim 2, being prepared from the following raw materials in part by mass: 7.2 parts of the acrylic acid, 3.5 parts of the N-vinylpyrrolidone, 6.3 parts of the sodium methallyl sulfonate, 48 parts of the isopentenyl polyethylene glycol ether, 0.168 part of the oxidizing agent, 50.048 parts of the reducing agent, and 50 parts of the water.

4. The polycarboxylate thinner for the carbonate/bicarbonate contamination resistant water-based drilling fluid according to claim 1, wherein the isopentenyl polyethylene glycol ether is an isopentenyl polyethylene glycol ether with molecular weight 2400 or an isopentenyl polyethylene glycol ether with molecular weight 3000.

5. A preparation method of the polycarboxylate thinner for the carbonate/bicarbonate contamination resistant water-based drilling fluid according to claim 1, comprising the following steps:
    i) fully dispersing the isopentenyl polyethylene glycol ether and the oxidizing agent in water, and performing reaction to obtain a mixture I;
    ii) mixing the acrylic acid, the N-vinylpyrrolidone, and the sodium methallyl sulfonate to obtain a mixture II, and dropwise adding the mixture II into the mixture I to obtain a mixture III; and
    iii) dropwise adding a reducing agent aqueous solution into the mixture III, performing reaction and adjusting a pH value, to obtain the polycarboxylate thinner for the carbonate/bicarbonate contamination resistant water-based drilling fluid.

6. The preparation method of the polycarboxylate thinner for the carbonate/bicarbonate contamination resistant water-based drilling fluid according to claim 5, comprising one or more of the following conditions:
    i. after full dispersion of the isopentenyl polyethylene glycol ether and the oxidizing agent in the water, a reaction temperature is room temperature, a reaction duration is 3-5 h, and the reaction is performed under a protection of a protective gas with continuous stirring; and the protective gas is nitrogen or argon;
    ii. a dropwise addition rate of the mixture II into the mixture I is 5-10 g/h; the dropwise addition is performed at the room temperature under the protection of the protective gas with continuous stirring; and the protective gas is the nitrogen or the argon;
    iii. a mass concentration of the reducing agent aqueous solution is 0.05% to 0.1%; a dropwise addition rate of the reducing agent aqueous solution is 10-30 g/h; the reducing agent aqueous solution is dropwise added at the room temperature and under the protection of the protective gas with continuous stirring; and the protective gas is the nitrogen or the argon;
    iv. after dropwise addition of the reducing agent aqueous solution, the reaction temperature is the room temperature, the reaction duration is 2-6 h, and the reaction is performed under the protection of the protective gas with continuous stirring; and the protective gas is the nitrogen or the argon; and
    v. the pH value is adjusted to 7-11 by adding a sodium hydroxide aqueous solution at a mass concentration of 10%-30%.

7. The preparation method of the polycarboxylate thinner for the carbonate/bicarbonate contamination resistant water-based drilling fluid according to claim 5, wherein the pH value is adjusted to 7-8 by adding a sodium hydroxide aqueous solution at a mass concentration of 10%-30%.

8. A method for reducing viscosity, shear force, and fluid loss of a drilling fluid system, comprising a step of adding the polycarboxylate thinner for the carbonate/bicarbonate contamination resistant water-based drilling fluid according to claim 1, into the drilling fluid system.

* * * * *